(No Model.)  4 Sheets—Sheet 1.

J. W. PRIDMORE.
MOWER.

No. 596,542.  Patented Jan. 4, 1898.

WITNESSES:
E. E. Clinton.
John M. Culver.

INVENTOR
John W. Pridmore
BY R. B. Swift
ATTORNEY.

(No Model.) 4 Sheets—Sheet 2.

J. W. PRIDMORE.
MOWER.

No. 596,542. Patented Jan. 4, 1898.

WITNESSES:
E. E. Clinton
John M Culver

INVENTOR
John W. Pridmore
BY R. B. Swift
ATTORNEY.

(No Model.)    4 Sheets—Sheet 3.
J. W. PRIDMORE.
MOWER.
No. 596,542. Patented Jan. 4, 1898.
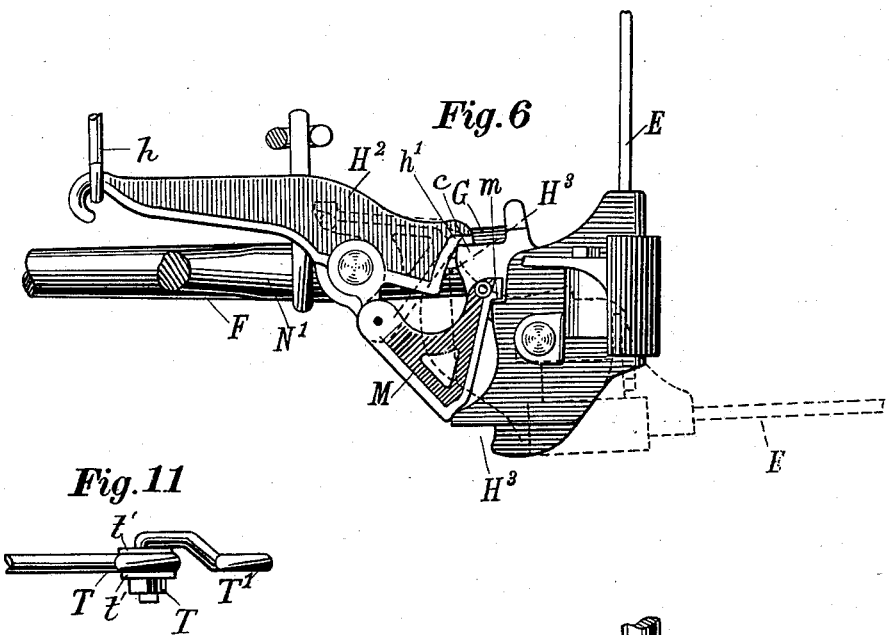
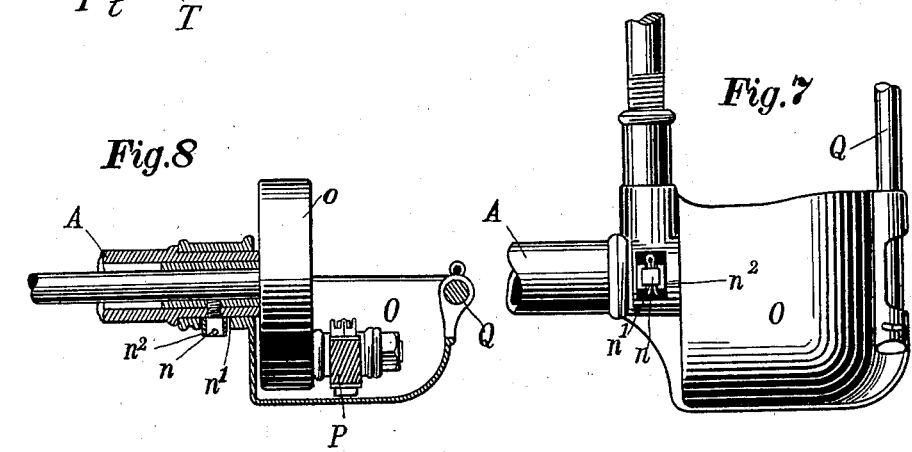
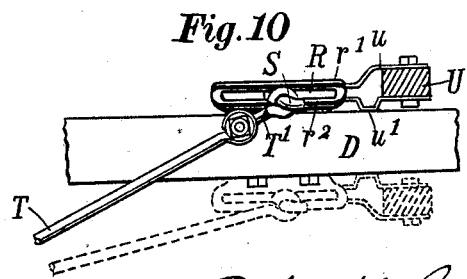
WITNESSES:
E. E. Clinton.
John M. Culver
INVENTOR
John W. Pridmore
BY R. B. Swift
ATTORNEY.

(No Model.)  4 Sheets—Sheet 4.

J. W. PRIDMORE.
MOWER.

No. 596,542.  Patented Jan. 4, 1898.

UNITED STATES PATENT OFFICE.

JOHN W. PRIDMORE, OF CHICAGO, ILLINOIS, ASSIGNOR TO THE McCORMICK HARVESTING MACHINE COMPANY.

MOWER.

SPECIFICATION forming part of Letters Patent No. 596,542, dated January 4, 1898.

Application filed March 16, 1896. Serial No. 583,358. (No model.)

*To all whom it may concern:*

Be it known that I, JOHN W. PRIDMORE, a citizen of the United States, residing at Chicago, in the county of Cook and State of Illinois, have invented certain new and useful Improvements in Mowing-Machines, of which the following is a specification.

My invention relates to an improvement in front-cut two-wheel mowing-machines in which a supplemental frame pivotally connected to the main frame of the machine supports a cutting apparatus that extends to the side of the machine; and the objects of my improvement are, first, to provide a joint for the coupling-frame where it connects to the main frame of the mower that shall be capable of a closer fit and still allow a movement of the coupling-frame at its free end and to make this connection simple and one that shall be little liable to wear; second, to provide a better lock to hold the cutter-bar in a vertical position when the machine is out of operation; third, to provide a convenient lever arrangement by which the coupling-frame and finger-bar can be raised and lowered while the machine is in operation; fourth, to provide means for making the same draft connection operate above the tongue or below it as the operator of the machine may desire, and, fifth, to improve the gear of the machine and the manner of clutching and unclutching it. I attain these objects by the mechanism illustrated in the accompanying drawings, in which—

Figure 1:
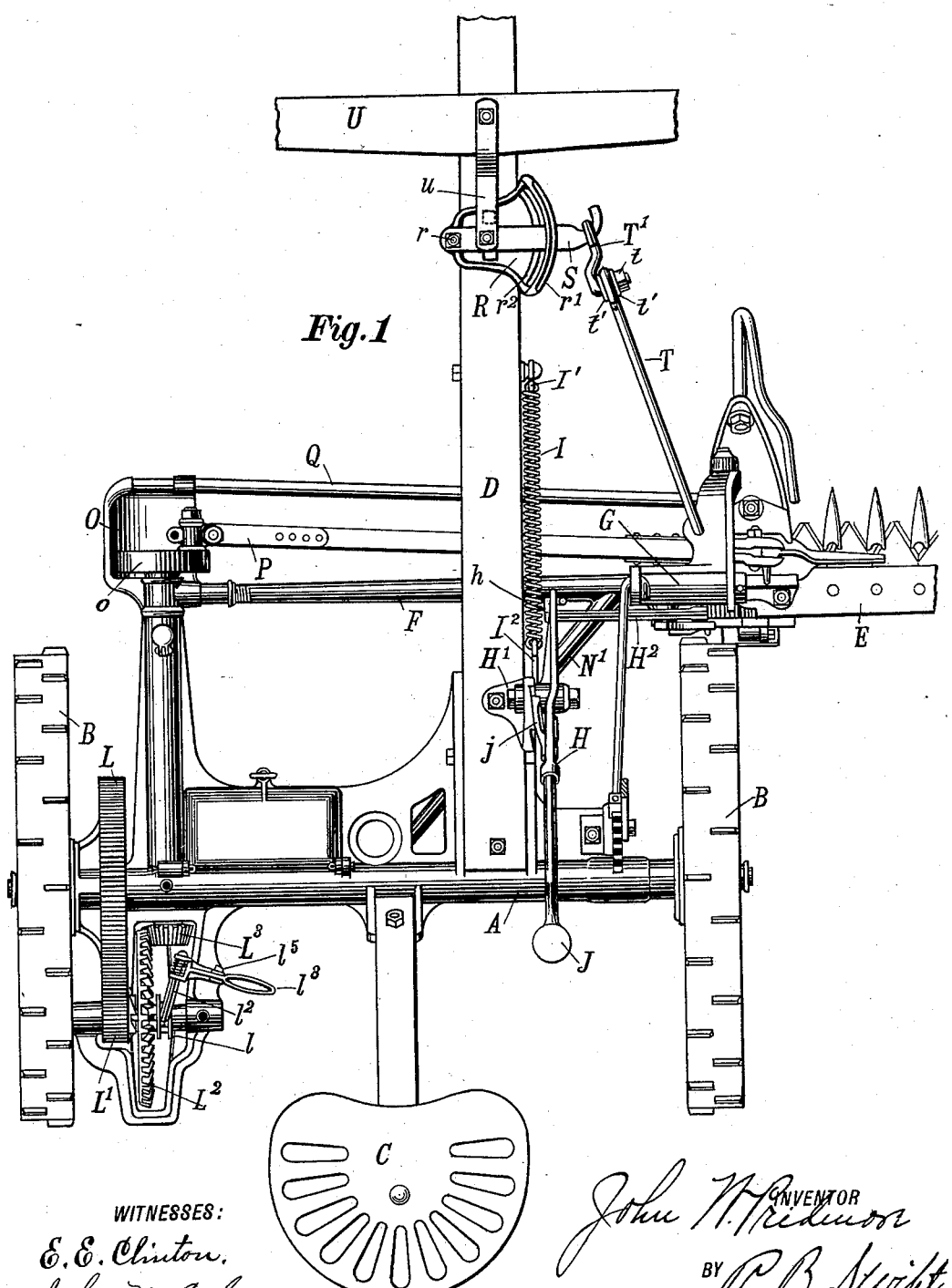
Figure 2:
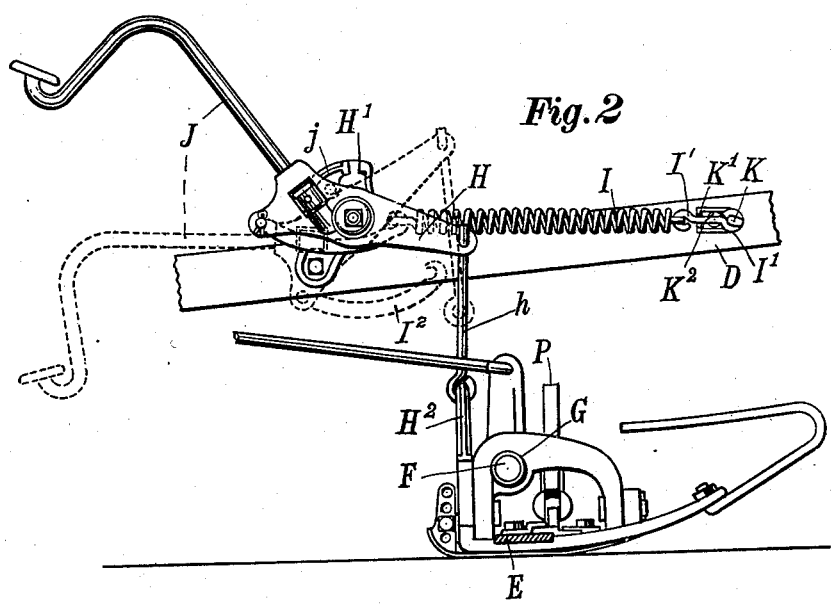
Figure 3:
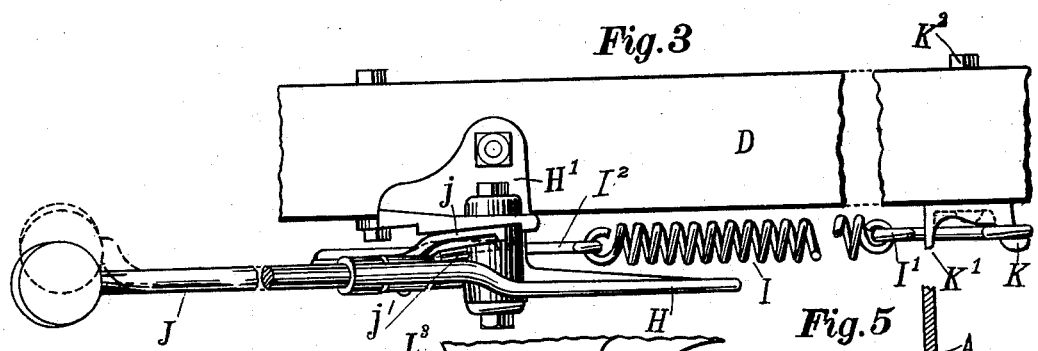
Figures 4, 5:
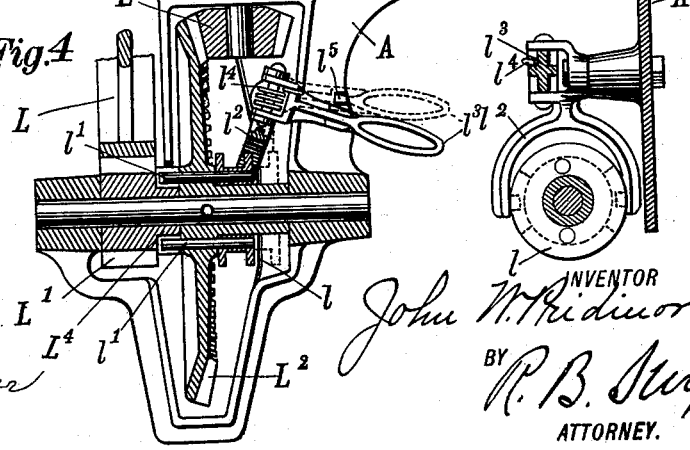
Figure 12:
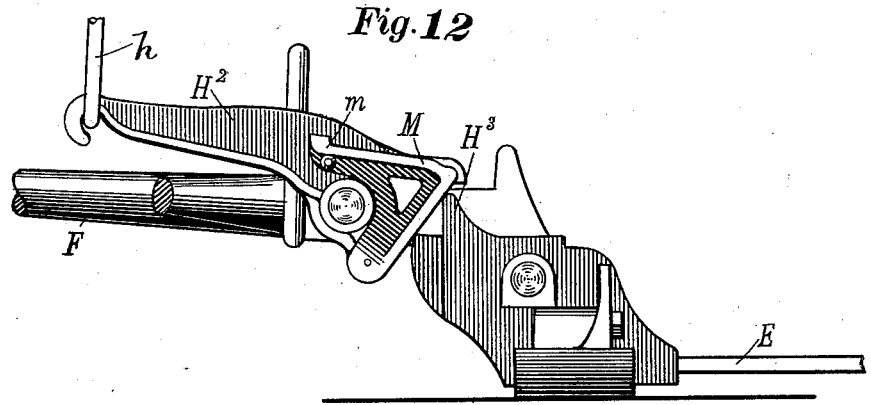
Figure 13:
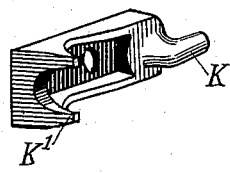
Figure 14:
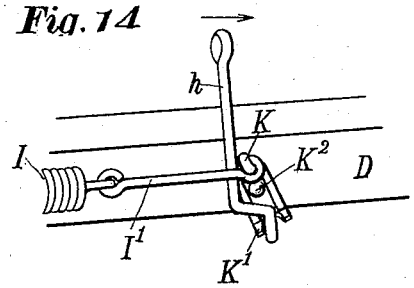
Figure 15:
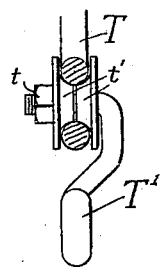

Figure 1 is a plan view of a mowing-machine containing my invention. Fig. 2 is an enlarged side view of the lifting-lever with a part of the coupling-frame and finger-bar portion of the cutting apparatus, the lifting-lever being shown raised in dotted lines. Fig. 3 is a top view of the same parts. Fig. 4 is a top view of the gearing of the machine, the gearing and the frame being shown in section. Fig. 5 is a side view in section of the gear and the lever for clutching and unclutching the parts. Fig. 6 is a view of the lock that holds the cutter-bar in a vertical position, the position of the parts when the cutter-bar is down being shown in dotted lines. Fig. 7 is a view of the under side of the sleeve with the shield attached, by which the coupling-frame is pivoted to the main frame of the machine. Fig. 8 is a side view with the sleeve and its shield in section, as well as the part of the main frame on which it is pivoted. Fig. 9 is a perspective view of the washer that holds the sleeve on the frame of the machine. Fig. 10 is a side view of the draft plate and rod with the parts when underneath the tongue shown in dotted lines. Fig. 11 is a view of the end of the draft-rod that is near the draft-plate with its extension. Fig. 12 is a view of the same parts as are shown in Fig. 6 with the finger-bar in its horizontal position and the locking-dog turned back. Fig. 13 is a perspective view of the casting by which the end of the spring is fastened to the pole. Fig. 14 is a perspective view showing one stage of the operation in the fastening of the end of the spring to the pole. Fig. 15 is a view, partly in section, showing the method of connecting the draft-rod to its extension.

Similar letters refer to similar parts throughout the several views.

The frame A, the wheels B, the seat C, the tongue D, and the finger-bar E may be of any of the usual constructions of front-cut two-wheel mowers which are now well known and upon the market.

To the coupling-frame F the finger-bar E is pivoted by means of a sleeve G, by which it is allowed a rolling motion, to which sleeve the finger-bar is pivoted on pivots that allow the bar to be lifted to a vertical position. As the mower is in operation in the field the coupling-frame and finger-bar portion of the cutting apparatus has to be frequently lifted to pass obstructions, in turning the machine at the corners, and in moving it from place to place. It is especially desirable that such a convenient and easy way of handling these parts as will enable the operator to quickly place them in any desired position without removing his hands from the lines which guide the team shall be provided, and to accomplish this a lever H has been provided that is pivoted on a post on the casting H', that is bolted to the tongue D of the mower. One end of this lever H is connected with the coupling-frame and finger-bar portion of the cutting apparatus by means of a link $h$ and a gag-lever $H^2$. This gag-lever is pivoted to the sleeve G, and when the mower is in operation one end of it rests upon an extension H³ from the finger-bar. When the finger-bar is turned into a vertical position, the mower then of course being out of gear, a nose h' on the end of the gag-lever prevents the gag-lever H² from swinging on its pivot too far by striking a ledge c on the sleeve G. A spring I reacts between the frame of the mower and the lifting-lever H and tends to rock the lever on its pivot, and thus raise the coupling-frame and finger-bar portion of the cutting apparatus. In order to make a handy connection between the spring I and the lever H, the spring is extended to the rear side of the pivot of the lever H by means of a piece of strap-iron I² and there connected by a hook on the strap I² to the lever. This extension I² is curved, as shown in dotted lines of Fig. 2, so as to bring the stress of the spring when the coupling-frame and cutter-bar are upon the ground more nearly in line with the pivot of lever H. The rod I' is connected to the spring at the other end by a hook. To make the handling of these parts more convenient, a handle J is extended from the lever H and so bent and extended as to be within convenient reach of the foot of the operator upon the machine. This handle J is pivoted in the lever H so as to roll on its pivot, and to it is fastened a dog j, that engages with the notches on a flanged extension from the pivot-casting H'. It will be noticed that the lever-handle J is extended so as to come somewhat outside of the direct downward action of the operator, so that any stress applied upon the handle J will tend to rock it in its pivot, thus keeping the dog j in contact with the notches on the flange on the pivot-casting H'. When it is desired to unlock the parts and allow them to drop to their normal positions, a side pull by the foot will swing the handle J in its pivot, and the dog will thus be released from engagement.

Attention is called to the fact that in the construction shown the leverage of the spring increases as the parts are raised, and its stress is such that the coupling-frame and finger-bar portion of the cutting apparatus can be so nearly sustained when the parts are raised by the handle J that there will be little difficulty in the operator pulling the crank of the handle J toward him sufficiently to unlock the dog. When the parts constituting this lifting device are removed and the spring is to be attached, it is necessary, in order that it shall have sufficient strength, that some means be provided to enable the person putting up the machine to stretch it sufficiently and when stretched attach it to the tongue. An attachment has been formed that consists of a small casting that has upon one end of it a hook K and at the other a notched flange K'. The lever H is attached to its pivot on the tongue and swung on its pivot so as to bring the points of attachment of the spring into the shortest distance between them. The casting having the hook K is then attached to the tongue, the hook being turned toward the lever H.

A convenient way of throwing the spring I under tension is shown in Fig. 14. The link h, which has not yet been used to connect the lifting-lever with the gag-lever H², is used as a lever to turn the connecting-casting on its pivot and is placed, as shown in the drawings, with its end between the projections K', and, resting against the hook K, acts as a lever, by which the operators can turn the fastening on the bolt K² as a pivot. When the hook K is turned to the farthest point away from the lever H, the link I' on the end of the spring I will fall between the projections K' and the fastening be prevented from turning on its pivot. By tightening the pivot-bolt K² a secure connection is made. The link h is then put into position to connect the lifting-lever with the gag-lever.

The making of a practical mowing-machine, one that can stand years of hard usage, is more difficult than would be supposed by those unacquainted with the art upon looking at a mower. The coupling-frame and finger-bar portion having to follow the inequalities of the surface of the ground, dropping into hollows and jumping over obstructions, causes a great strain upon the parts which test the gearing and the strength and stability of all the parts of the mower. It has been one of the difficult problems in mower building to construct a system of gears that shall give the proper speed to the knife, and to form them with such simplicity as to make them entirely practical, and to form a clutching device that shall connect the chain of gearing, so that the machine can be easily unclutched by the operator from the seat. In order to make the most simple form of a gear, a spur-wheel L is keyed to the main axle of the machine and is driven in well-known ways by both the wheels of the machine. A spur-pinion L' is positioned on a counter-shaft outside of the axle and meshes with the spur-wheel L. On the same counter-shaft a bevel-wheel L² is placed. In the exemplification shown in the drawings it has been keyed to the shaft, so that the shaft will turn in the bearings in the frame, rather than have the shaft fixed in the frame, with the spur-wheel and bevel-pinion turning upon the shaft. A bevel-pinion L³ is positioned on the crank-shaft, and motion is transmitted to the crank and to the knife moving through the finger-bar by means of the pitman in ways that are well known. So great is the strain upon the gear that the clutching-dogs are frequently sheared off and the ratchets become worn, thus allowing the clutch to slip, and much trouble is caused the operator. The parts that are clutched together when they become worn tend to separate, and difficulty is encountered in keeping them together. To obviate this, the bevel-wheel and bevel-pinion just fill the opening in the frame of the machine. They, end to end, completely fill the space. The ratchet is formed by a sleeve $l$, that slides on the hub of the bevel-wheel $L^2$. On this sleeve $l$ there are pins $l'$, that pass through holes in the bevel-wheel $L^2$ and engage in notches in the spur-pinion $L'$. The sleeve $l$ is grooved, and a yoke $l^2$, pivoted on the frame of the mower, as shown in Fig. 5, enters this groove. A handle $l^3$ is pivoted in the yoke $l^2$ on a pivot parallel with the direction of the yoke, so that it stands at right angles to the yoke and is held by means of the spring $l^4$ against the frame. A stop $l^5$ on the frame holds the clutch to one extreme of its movement, and when the handle is lifted by the hand or toe of the operator and thrown to the other side of the stop the clutch is held to the other extreme of its movement. The sleeving of the part $L^4$ on the hub of the bevel-wheel $L^2$ allows a longer hub to be used, which tends to prevent the bevel-wheel becoming loose on its shaft and gives a larger bearing for the sleeve. It also throws the pins $l'$ farther from the center, thus relieving them from the great shearing strain that would result were they closer to the center of the shaft. It will be noticed that the bevel-wheel is backed up to the spur-wheel and its pinion. The ordinary construction has been to face the spur-wheel. The positioning of the bevel-wheel so that it backs to the spur-wheel and pinion places the gear in a much more compact shape and reduces the size of the frame of the machine and of the cover which covers the gear, making the machine look far neater and more compact.

There have been many ways devised for holding the finger-bar of a mower in a vertical position when the machine is being transported from field to field. The old way was to connect the finger-bar by a rod to the frame. This rod was, however, continually jumping from its fastenings as the machine went over rough ground and rattling upon the frame. Other devices have been formed to lock the bar near its hinge; but these have not had sufficient leverage, so that the lock shortly becomes loose and causes trouble. In the construction here shown a lock M is pivoted to the gag-lever $H^2$, below the pivot of the gag-lever, but on the side of the gag-lever toward the finger-bar. One arm of this lock bears against the extension $H^3$ of the finger-bar, while a stop $m$ prevents the lock from dropping too low. When the finger-bar is to be raised to a vertical position, the lock is thrown on its pivot so as to drop into place, and the bar is turned up. The coupling-frame and cutter-bar are then raised from the ground as high as possible, the movement of the gag-lever on its pivot being one that tends to throw the lock against the heel of the finger-bar and hold the finger-bar rigidly in place.

It is very plain to be seen that the finger-bar must be connected to the frame of the mowing-machine not only so that it will rise and fall to conform to the inequalities of the surface of the ground, but it must be so rigidly attached that its outer end will not sag back from a right line as the mower is drawn against the grass. The tendency of the finger-bar, projecting to one side of the machine, as it does, is always to sag rearwardly, and it therefore is necessary to make all the joints that connect it to the coupling-frame and the coupling-frame to the machine in the most accurate and substantial manner, so that there will be no springing of the parts nor any such play as will cause wear. The coupling-frame N, that is shown in the drawings, is forged from steel and is braced by a rearwardly-extending brace $N'$, that is continued back beneath the frame of the machine and pivoted to it. These coupling-frames have heretofore been connected to the crank extension of the main frame of the mower by means of joints formed by ears and pins or balls and sockets. These ear-and-pin joints have had such bearings that they become easily worn, and it has been found quite difficult to form the ball-and-socket-joints commercially, so that they will fit and be free of excessive wear. To remedy the excessive wear and to make a strong and durable pivot-bearing, the end of the coupling-frame has been sleeved on the crank extension. The end of the crank extension on the main frame A is turned to an exact size, and the sleeve of the coupling-frame is placed on this turned part.

A set-screw $n$, working in a slot $n'$, serves to keep the coupling-frame from slipping back and forth on the crank extension. This set-screw also serves to hold the bushing on the crank-shaft in place. That the set-screw may have a better bearing and the coupling-frame be prevented from wearing it a square box-washer $n^2$ is formed to fit over the head of the set-screw, which is bored, and a spring-key placed through it to hold the washer in place and to prevent the set-screw from turning and allowing the parts to become loose. It has been found heretofore quite difficult to keep the crank-wheel O from gathering loose straws as the machine passes through the field and wrapping them about itself, and it has been found necessary to shield the wheel. Such shields have heretofore been cast upon the frame or have been bolted to the frame. When cast upon the frame, they must be very low in order that the drill, when the frame is being bored, can get past it to bore the front bearing for the crank-shaft. These low shields do not protect the crank-wheel from wrapping, while if the crank protection is bolted to the crank-shaft extension of the main frame it makes a more costly job and the extension locks cumbersome. I have avoided these difficulties by forming the shield and the coupling-sleeve in one piece, fitting the coupling-sleeve with a screw-thread, and threading the coupling-frame, so that when the parts are being assembled the coupling-frame can be turned into the sleeve and the parts given just the right length, so that the pitman P will reciprocate the knife through the fingers on the finger-bar and a perfect cutting stroke be given.

The forming of the shield and sleeve in one piece makes a very neat and simple construction, and one that has the largest possible bearing upon the frame and will therefore wear the least possible amount. A protection-rod Q is fastened at the front of the shield and extends along in front of the pitman to the sleeve G and protects the pitman from the grass and from obstructions. The draft connection is shown on top of the tongue in Fig. 1, and in Fig. 10 it is shown on top of the tongue in full lines and beneath the tongue in dotted lines. The draft-plate R is bolted to the tongue and has a pivot $r$ for the draft-lever S at one side and a long slot through which the draft-lever S vibrates as the coupling-frame and finger-bar portion of the cutting apparatus rises and falls in passing over uneven surfaces. The draft-lever S is connected to the cutting apparatus by a draft-rod T, which has an extension T', that is used when the draft device is on top of the tongue. When it is desired to place the evener beneath the tongue, the draft-plate R is turned over and placed beneath the tongue, the same bolts attaching it, and the long slot in the draft-plate holds the parts from sagging. The draft-rod extension T' is taken off by removing nut $t$ and the companion flange-washer $t'$, and the main part of the draft-rod T is connected to the draft-lever S, and the machine is ready for operation with a lower draft. When the parts are on top of the tongue, the line of draft on the cutting apparatus is higher, and there is therefore more of the weight of the cutting apparatus transferred from the ground and upon the tongue of the machine. This upward lift is very desirable in rough and boggy grounds; but the amount of weight that is transferred to the machine from the cutting apparatus is only partly carried upon the frame of the mower. The rest of it is transferred along the tongue and is carried upon the horses' necks through the breast-straps. When the draft device is beneath the tongue, the inclination of the draft-rod becomes less, and there is therefore less of the weight of the cutting apparatus carried onto the tongue and therefore less transferred to the frame of the machine and the end of the tongue. Dropping the draft device lower changes the inclination of the tugs of the team, and the machine will have very little weight upon the end of the tongue, the tongue being lifted by the draft. Practice has shown that this is a more desirable construction, inasmuch as the necks of the team do not become chafed, as they do when weight is carried upon them through the breast-straps. Attention is called to the fact that the rave $r'$ is connected to the draft-plate R and has a longer radius than the portion $r^2$ of the draft-plate R, that supports the draft-lever S when the parts are on top of the tongue.

Were the rave $r'$ directly over the portion $r^2$ of the draft-plate R the wear on the draft-lever S would be in the same position on the lever, though on opposite sides of it, and it would be very much weakened. The evener U is attached to the draft-lever S by means of straps $u$ above the evener and $u'$ below it. The strap $u'$ is formed with a seat having a much larger surface than the head of the evener-bolt to rest upon the tongue, in order that the bolt that fastens the straps to the evener may not cut the tongue, and that when the evener is below the tongue the chair will prevent the evener from twisting and cutting into the tongue, thus destroying the freedom of draft that is necessary.

Having now described my invention, what I claim, and desire to secure by Letters Patent, is—

1. In combination in a mowing-machine the rising-and-falling coupling-frame and finger-bar portion of the cutting apparatus, a lever positioned upon the machine-frame, and connected with the coupling-frame and finger-bar, a spring reacting between this lever and the frame of the machine, which spring when in place is under high tension, and means for connecting the end of the spring to the frame, consisting of casting pivoted to the frame, and having projections therefrom which serve as stops for a lever, whereby the casting is turned on its pivot stretching the spring.

2. In combination in a mowing-machine, the rising-and-falling coupling-frame and finger-bar portion of the cutting apparatus, a lever positioned on the machine-frame and connected with the coupling-frame and finger-bar, a spring reacting between this lever and the frame of the machine, which spring is under high tension, and a connection for fastening the end of the spring to the frame, which consists of a casting having a hook at one end to which the spring is fastened, and at the other end a notched flange, in which notch the spring rests when the parts are in position, substantially as and for the purpose specified.

3. In combination in a mowing-machine, with its frame and wheels, a spur-gear on the main axle of the machine, a spur-pinion on a counter-shaft parallel with the main axle, a bevel-wheel positioned on the same counter-shaft with the spur-pinion, and having its teeth on the side away from the spur-wheel and spur-pinion, a sliding clutch whose clutching members pass through the bevel-wheel into engagement with the ratchets in the spur-pinion, the clutch sliding on the hub of the bevel-wheel, and the bevel-wheel and spur-pinion completely filling the space in the main frame, whereby the parts are brought closely together, and the sliding of the clutch cannot separate the spur-wheel and the bevel-pinion.

4. In combination in a mowing-machine with the frame, axle and wheels which support it and give motion to the axle, of a train of gearing in which a clutch is positioned, a clutch-shifter, consisting of an arm pivoted to the frame of the machine and extended into the path of the clutch, a secondary arm pivoted to this arm at an angle thereto, and a spring holding the secondary arm against a lock positioned on the machine-frame, substantially as and for the purpose specified.

5. In combination in a mowing-machine, a truck portion having a tongue, a coupling-frame and finger-bar portion, a shifting draft attachment fastened to the tongue and connected to the coupling-frame and finger-bar portion of the mower, the connection from the coupling-frame and finger-bar portion to the shifting draft-lever being formed of two members, the inner of which is equal to the distance between the shifting-lever and the coupling-frame and finger-bar portion when the draft device is beneath the tongue, substantially as and for the purpose specified.

6. In combination in a mowing-machine, having a truck with tongue and a coupling-frame and finger-bar portion, a shifting draft device attached to the tongue and to the coupling-frame and finger-bar portion, straps connecting the shifting draft device with the evener, the strap next to the tongue, being formed with a chair, whereby the evener is held from the tongue, substantially as and for the purpose specified.

7. In combination in a mowing-machine, a coupling-frame pivoted to the frame of the mower, a finger-bar pivoted to the coupling-frame, a lever pivoted on the main frame and connected with a gag-lever pivoted on the coupling-frame, one end of which gag-lever bears upon a projection from the heel of the finger-bar, a lock pivoted on the gag-lever on that side of the pivot of the gag-lever toward the finger-bar, whereby, when the parts are raised, the rocking of the gag-lever on its pivot will throw the lock pivoted to the gag-lever against the heel of the finger-bar, substantially as and for the purpose specified.

JOHN W. PRIDMORE.

Witnesses:
F. D. BACHE,
HENRY B. UTLEY.